United States Patent
Balboul

(10) Patent No.: US 7,919,947 B2
(45) Date of Patent: Apr. 5, 2011

(54) METHOD AND DEVICE FOR STARTING AN ELECTRIC MACHINE WITH A MAGNETICALLY MOUNTED ROTOR

(75) Inventor: Nour-Eddine Balboul, Köln (DE)

(73) Assignee: Oerlikon Textile GmbH & Co. KG, Monchengladbach (DE)

( * ) Notice: Subject to any disclaimer, the term of this patent is extended or adjusted under 35 U.S.C. 154(b) by 440 days.

(21) Appl. No.: 12/214,314

(22) Filed: Jun. 18, 2008

(65) Prior Publication Data

US 2008/0315812 A1 Dec. 25, 2008

(30) Foreign Application Priority Data

Jun. 22, 2007 (DE) .......... 10 2007 028 935

(51) Int. Cl.
*H02P 1/16* (2006.01)
(52) U.S. Cl. .......... 318/778; 318/623; 318/611
(58) Field of Classification Search .......... 318/778, 318/623, 611, 632, 607, 608, 430; 310/90.5
See application file for complete search history.

(56) References Cited

U.S. PATENT DOCUMENTS

| 5,969,451 A * | 10/1999 | Lyons et al. .......... 310/90.5 |
| 6,516,601 B2 | 2/2003 | Coenen .......... 57/406 |
| 2002/0002816 A1 | 1/2002 | Coenen .......... 57/404 |

FOREIGN PATENT DOCUMENTS

| DE | 100 22 736 A1 | 11/2001 |
| DE | 10 2005 032 184 A1 | 1/2007 |
| WO | WO 01/17096 A1 | 3/2001 |

* cited by examiner

*Primary Examiner* — Karen Masih
(74) *Attorney, Agent, or Firm* — K&L Gates LLP

(57) ABSTRACT

A method and a device with a control apparatus (50) for starting an electric machine (10) with a rotor (20), particularly the spinning cup of an open-end spinning machine, magnetically mounted by a bearing having permanent magnets (31, 32, 33, 34). An actuator system controls the position in the axial direction (35, 36) and two limitation bearings (41, 42), determine the axial end positions of the rotor. The actuator system brings about a lifting from the first axial end position, and a system variable during such lifting is compared with a reference value, and the rotor (20) is moved into the second end position, and the actuator system brings about a lifting from the second axial end position, and a system variable on lifting from the second end position is compared with a reference value.

14 Claims, 4 Drawing Sheets

METHOD AND DEVICE FOR STARTING AN ELECTRIC MACHINE WITH A MAGNETICALLY MOUNTED ROTOR

CROSS REFERENCE TO RELATED APPLICATIONS

This application claims the benefit of German patent application 10 2007 028 935.0, filed Jun. 22, 2007, herein incorporated by reference.

BACKGROUND OF THE INVENTION

The invention relates to a method and a device with a control apparatus for starting an electric machine with a magnetically mounted rotor, in particular for rotating the spinning cup of an open-end spinning machine. The magnetic bearing has permanent magnets, an actuator system for controlling the position in the axial direction and two axial limitation bearings, by means of which the axial end positions of the rotor are determined.

Electric machines with magnetically mounted rotors are used, for example, as the drive of gas ultracentrifuges, turbomolecular pumps, tool spindles, compressors, blood pumps and flywheels. A magnetic bearing is advantageous in particular at high rotational speeds, as it has a significantly lower power loss compared to mechanical bearings such as roller or sliding bearings. A particular area of use is the drive of the spinning cup of open-end spinning machines. Rotational speeds of over 100,000 revolutions per minute are required here.

German Patent Publication DE 100 22 736 A1 discloses a magnetically mounted drive for a spinning rotor of an open-end spinning machine and describes the control and the structure of a magnetic bearing. The magnetic bearing shown here consists of two permanent magnetic rings in each case on each shaft end. A magnetic bearing with permanent magnets, a passive bearing is also referred to, is unstable in at least one axis. The cited prior art shows a radial bearing which is instable in the axial direction. For this reason, actuators are necessary, with the aid of which the bearing can be controlled in the axial direction. Coils or windings which may amplify or weaken the magnetic field of the permanent magnets are suitable as actuators. In order to prevent the bearing magnets impacting against one another if the actuator fails, or in the rest state when the machine is switched off, an arrangement of this type has two axial limitation bearings, also called safety bearings. The axial end positions of the rotor are determined by the limitation bearings. In the rest state, the rotor rests on one of the axial limitation bearings. When the machine is started up the rotor, through suitable activation of the actuator, has to lift off from its limitation bearing.

Apart from the high rotational speed, high demands are placed on the drive and the bearings of a spinning rotor due to the high risk of soiling from fibre residues. In the case of soiling of this type it is possible that the magnetically mounted rotor can no longer be held in the hovering state by the control. Crashes may then result and therefore considerable damage to the bearing, drive or spinning rotor. However, if mechanical damage is already present or the bearing magnets are demagnetised, the hovering rotor may fall during operation.

In order to avoid the hovering rotor falling, various monitoring possibilities are known from the prior art to recognise soiling or faults during operation and to be able to switch off the magnetically mounted drive prior to a crash. International Patent Publication WO 01/17096 A1 discloses the possibility of recognising faults in the magnetic bearing during operation by the evaluation of a sensor. German Patent Publication DE 10 2005 032 184 A1 provides that during operation, the current in the actuator coils is evaluated to control the position in the axial direction and deviations of the bearing air gaps from predetermined limit values are inferred therefrom.

It is possible for soiling or faults of the magnetic bearing to already be present before the drive machine is run up to operating speed. It would be desirable to recognise such soiling or faults as soon as possible and not firstly when the machine is rotating. If faults in the bearing are only recognised during the run-up or during stationary operation, it is necessary for the machine to be reliably decelerated. This takes time and lowers the operating safety.

SUMMARY OF THE INVENTION

It is therefore an object of the present invention to already recognise faults or soiling of an electric machine with a magnetically mounted rotor, in particular for rotating the spinning cup of an open-end spinning machine during starting and to increase the operating safety of the magnetic bearing.

To achieve this object, a method for starting an electric machine with a magnetically mounted rotor, in particular for rotating the spinning cup of an open-end spinning machine, is proposed, the magnetic bearing having permanent magnets, an actuator system for controlling the position in the axial direction and two axial limitation bearings, by means of which the axial end positions of the rotor are determined, and the actuator system for controlling the position in the axial direction is activated in such a way that it brings about a lifting off from the first axial end position, and a system variable on lifting off from the first end position is compared with a reference value, and the rotor is moved into the second end position, and the actuator system for controlling the position in the axial direction is activated in such a way that it brings about a lifting off from the second axial end position, and a system variable on lifting off from the second end position is compared with a reference value, and when there is a previously established deviation of the system variable from the reference values, a fault signal is generated.

At the beginning of the start process, the rotor is located in one of the two axial end positions. The lifting off from this first end position is brought about by the actuator system for controlling the position in the axial direction. According to the invention, the run-up of the machine is not now started, but the rotor is moved, for example, by a pulse of the actuator system to control the position in the axial direction, from the hovering position into the second end position. The lifting off process from the second end position is monitored correspondingly to the first lifting off. The lifting off from the two axial limitation bearings is in this case an essential component of the method according to the invention. In this case, the system variables can be compared not only with predetermined reference values, but differences between the two lifting off processes can also be recognised and unbalances thus inferred. A demagnetisation of a magnetic ring would only be clearly visible in the event of lifting off from the damaged bearing. The lifting off from the intact bearing would hardly show changes.

According to a preferred embodiment of the method according to the invention, the actuator system for controlling the position in the axial direction consists of at least one electric winding.

According to a further preferred embodiment of the method according to the invention, the system variable is the current impressed into the electric winding, or a variable proportional thereto.

The current through the electric winding of the actuator system is in any case required for the control of the position in the axial direction. It can be measured easily and precisely. To control the axial position, the current is frequently used as a control signal, so the controller output for the activation of the end stage is proportional to the current. This system variable can also be used for the evaluation of the lifting off process.

According to a further preferred embodiment of the method according to the invention, the maximum values of the system variable are used to determine the deviation from the reference values.

The current in the actuator winding as the system variable is proportional to the force which has to be applied for the lifting off. The attractive force between the two magnetic rings, which has to be overcome when lifting off, is inversely proportional to the square of the spacing of the magnetic rings. If, therefore, between the limitation bearing and the rotor, the spacing between the magnetic rings in the end position is increased by a foreign body, for example a bat, the attractive force decreases and therefore also the required lifting off current. If the spacing between the magnetic rings is reduced by damage or an inadmissible displacement, the lifting off current increases. In the case of a demagnetisation, the attractive force of the magnets decreases. If the magnets are demagnetised, the attractive forces of which have to be overcome during the lifting off, the lifting off current decreases. If the magnets are demagnetised, the attractive forces of which assist the lifting off from the current end position, the lifting off current increases. In practice, when lifting off, the current is increased through the actuator coil until the rotor is lifted off. The maximum value occurring can then be compared with the reference values. In this case, a lower and an upper limit value for the maximum value of the current can be given as the reference value.

According to a further preferred embodiment of the method according to the invention, the measurement signals of the position sensor for determining the axial position are used as the system variable.

Alternatively or in addition to the current, the position sensor signal, which is also required to control the position in the axial direction, can also be used to assess the lifting off processes. Changes owing to soiling or demagnetisations can be detected both in the actuator current and in the position signal. In the event of sluggishness through soiling or a demagnetisation, the rotor is forced from its axial central position by the zero current control, so in the lifting off processes from the two end positions, different paths are covered. It is to be noted that the spacings between the end positions move in the tenth of millimeter range. High requirements are therefore placed on the precision and linearity of the position sensor. With the current possibilities of calibrating a position sensor by means of a microcontroller, the precision requirements are, however, achievable.

According to a further preferred embodiment of the method according to the invention, the bearing forces on the axial limitation bearings are used as the system variable, the bearing forces being measured by means of a sensor. The sensor may be integrated, in this case, into the bearing system and configured as a force or pressure sensor.

According to a further preferred embodiment of the method according to the invention, the machine is prevented from starting up by the fault signal, which is generated on deviations of the system variable from the reference values. In this case, an impairment is assumed, which calls into question reliable operation of the magnetic bearing during operation. The intervention of the operating staff to eliminate the fault is then required. It would also be conceivable to fix two levels of reference values, the first level only generating and optionally recording a warning disturbance and only the second level leading to a starting prevention or switching off. In the case of the warning disturbance, the fault can then be eliminated during the next planned intervention into the system.

To achieve the object, a device with a control apparatus for starting an electric machine with a magnetically mounted rotor, in particular for rotating the spinning cup of an open-end spinning machine, is also proposed, the magnetic bearing having permanent magnets, an actuator system for controlling the position in the axial direction and two axial limitation bearings, by means of which the axial end positions of the rotor are determined, and the control apparatus being set up in such a way that it firstly brings about a lifting off from the first axial end position by means of the actuator system to control the position in the axial direction, it then causing a movement of the rotor into the second end position, and finally causing a lifting off from the second axial end position by means of the actuator system for controlling the position in the axial direction, and the control apparatus containing an evaluation mechanism, which compares a system variable on lifting off from the first and the second end position with reference values and in the event of a previously established deviation of the system variable from the reference values, generates a fault signal.

The control apparatus may, for example, consist of a microprocessor or a microcontroller, in which the described evaluation routines are implemented as a software code. The control apparatus in addition has interfaces for the inputting of parameters, such as, for example, the reference values, or for recording measurement values. Furthermore, there are corresponding output interfaces for activating the actuator system for controlling the position in the axial direction.

According to a further embodiment of the device according to the invention, the actuator system consists of at least one electric winding.

According to a further embodiment of the device according to the invention, the system variable is the current impressed into the electric winding, or a variable proportional thereto.

According to a further embodiment of the device according to the invention, the control mechanism uses the maximum values of the system variable to determine the deviation from the reference values.

According to a further embodiment of the device according to the invention, the control unit uses, as the system variable, the measurement signals of the position sensor for determining the axial position.

According to a further embodiment of the device according to the invention, the control unit uses, as the system variable, the bearing forces on the axial limitation bearings, the bearing forces being measured by means of a sensor.

According to a further embodiment of the device according to the invention, the control apparatus with the generation of the fault signal prevents the machine from starting up.

BRIEF DESCRIPTION OF THE DRAWINGS

The invention will be described in more detail below with the aid of an embodiment shown in the drawings, in which.

DETAILED DESCRIPTION OF THE PREFERRED EMBODIMENTS

Figure 1:
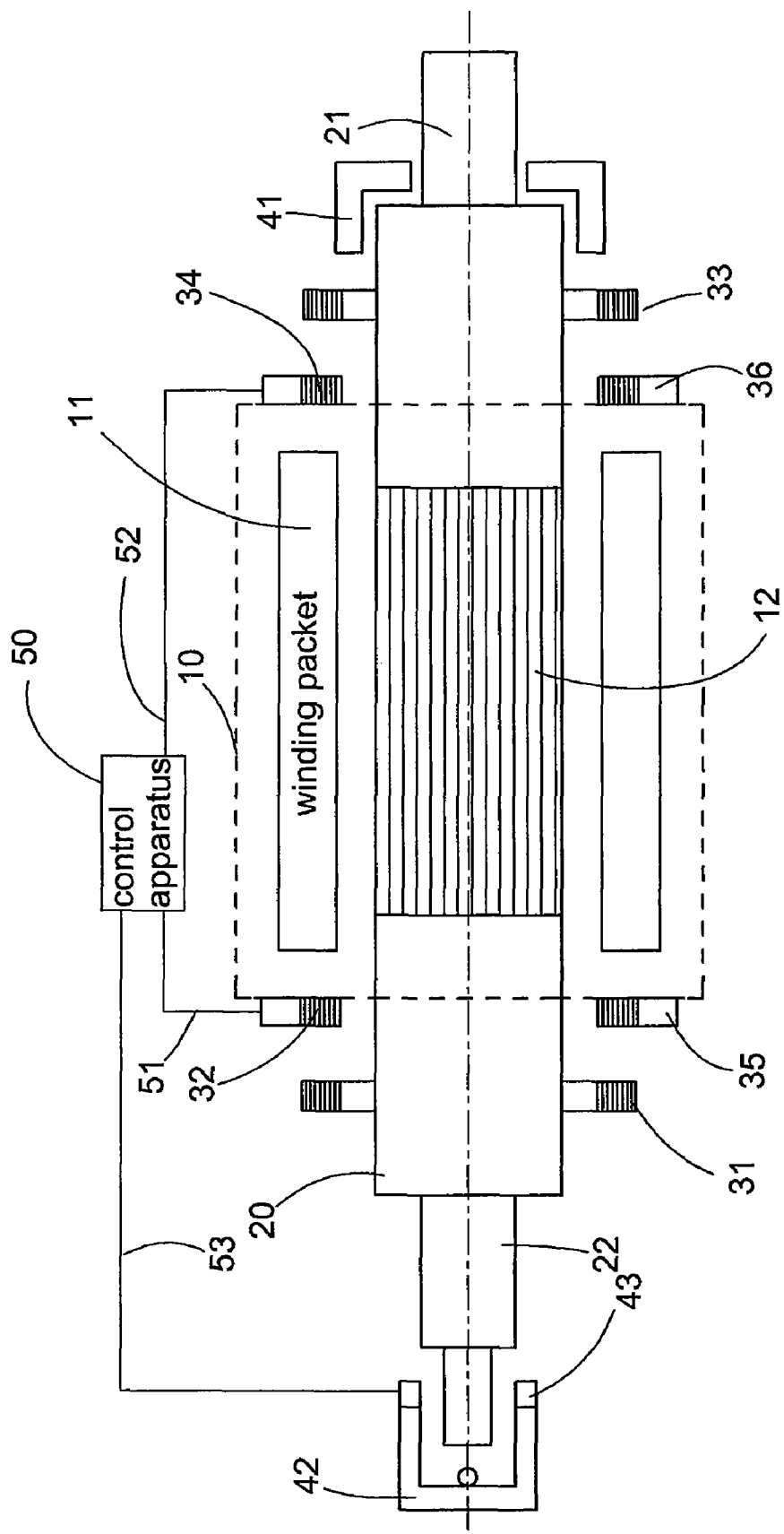
FIG. 1 shows a schematic view of an electric machine with a magnetically mounted rotor in the hovering state.

FIG. 1 shows a schematic view of an electric machine with a magnetically mounted rotor for rotating the spinning cup of an open-end spinning machine. In the embodiment shown, the electric machine 10 is an electronically commutated direct current motor. The motor 10 has, in the stator, a winding packet 11 and, in the rotor, a permanent magnet 12. The permanent magnet 12 is connected to the rotor 20. The rotor 20 has a front end 21 and a rear end 22. The front end 21 is mechanically coupled to a spinning cup, not shown here. A limitation bearing 41 is arranged at the front end and a limitation bearing 42 is arranged at the rear end. The limitation bearings offer protection in the event of failure or damage of the magnetic bearing, both in the axial and the radial direction. In addition, a position sensor 43 is located on the rear bearing to determine the position of the rotor 20 in the axial direction. An axially magnetised permanent magnetic ring is provided for the magnetic bearing at the front and at the rear end of the rotor, in each case. These have reference numerals 33 and 31. Two further axially magnetised magnetic rings 34 and 32 are connected to the stator of the machine. For the magnetic bearing, other magnet arrangements and magnetisation directions are also possible. The arrangement shown is unstable in the axial direction and therefore requires an actuator system for controlling the system in the axial direction. For this purpose, two windings 35 and 36 are arranged around the magnetic rings 32 and 34 connected to the stator. If a current flows through the windings, an axially effective magnetic field is produced, which can increase or weaken the magnetic field of the permanent magnets. It is also possible to control the position in the axial direction with only one coil. To activate the actuator system to control the position in the axial direction, a control apparatus 50 is provided, which is connected in each case to the actuator coils 35 and 36 by means of a two-core line 51 and 52. The current is impressed into the actuator coils through theses lines. Furthermore, the control apparatus is connected to the position sensor 43 by means of the data line 53 since, as described above, the position signal is required to control the position in the axial direction.

Figure 2:
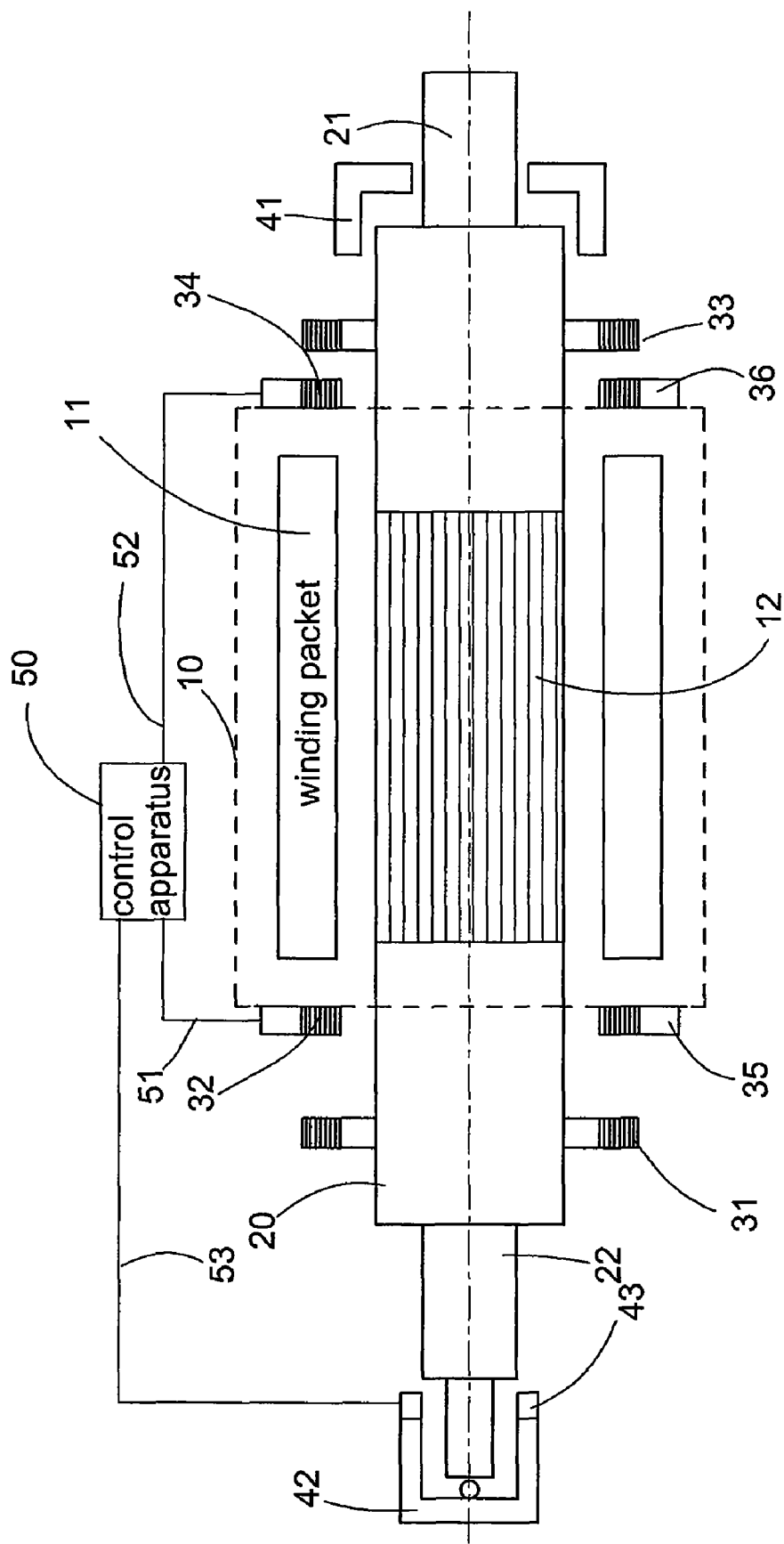
FIG. 2 shows a schematic view of an electric machine with a magnetically mounted rotor in an end position.

The limitation bearings 41 and 42 determine the axial end positions of the rotor. FIG. 1 shows the rotor in the hovering state. In FIG. 2, the rotor is in the rear end position and rests on the rear limitation bearing. The limitation bearings are adjusted in such a way that an adequate spacing is present between the magnetic rings even in the end positions of the rotor. To lift the rotor from the rear axial limitation bearing 42, the attractive forces between the magnetic rings 33 and 34 have to be weakened and/or the attractive forces between the magnetic rings 31 and 32 have to be increased.

Figure 3:
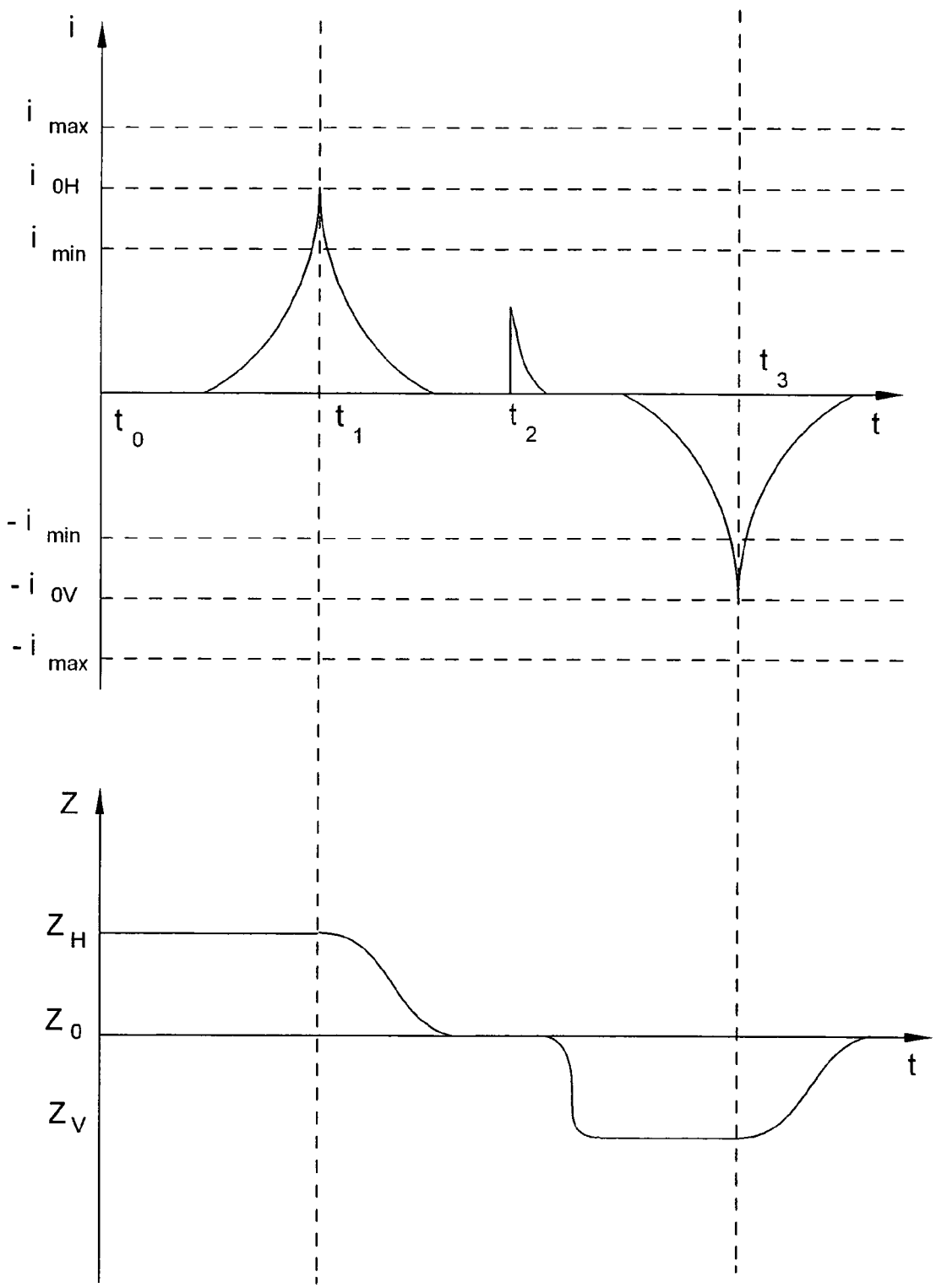
FIG. 3 shows a time course of the current in the winding to control the position and the time course of the position of the rotor during the reciprocal lifting off.

FIG. 3, in the upper graph, shows the time course of the current i through the winding of the actuator system to control the position in the axial direction when lifting off the rotor from the front and the rear limitation bearing. In the second graph of FIG. 3, the time course of the rotor position z is analogously shown in the axial direction. At the instant $t_0$, the rotor is located in a first limitation bearing, the rear one here, at the position $z_H$. The actuator winding is without current at this instant. To lift the rotor from the rear limitation bearing, the current in the actuator windings is slowly increased to a maximum value $i_{OH}$. The maximum value $i_{OH}$ is the lifting off current, which is required to lift the rotor from the limitation bearing. On reaching the lifting off current, the rotor moves into the hovering position $z_0$. The actuator current can then be moved back again. According to the invention, the rotor has to be moved into the second end position, the front one here. This takes place by means of the current pulse at the instant $t_2$. The rotor leaves the hovering position $z_0$ due to the current pulse and is transferred into the front end position $z_v$. The lifting off process is then again carried out similarly to the first lifting off. At the instant $t_3$, the rotor begins to lift off again and is transferred again into the hovering position $z_0$. For lifting off, the lifting off current with the amount $i_{OV}$ is required. The currents for lifting off from the rear and the front limitation bearing, as can be inferred from the figure, have an inverted sign. Prior to the run-up of the machine, the maximum values of the current amounts $i_{OH}$ and $i_{OV}$ which have occurred in the two lifting up processes are now evaluated. The maximum values of the currents have to lie between a lower limit $i_{min}$ and an upper limit $i_{max}$.

Apart from checking the magnetic bearing prior to the run-up of the machine, the method described can also be used for the axial adjustment of the limitation bearings during assembly. The use of the lifting off current to adjust the limitation bearings has the advantage that no expensive position measuring technology is required. As already mentioned, the axial bearing play of the magnetic bearing moves within the tenth of a millimeter range. To adjust the axial limitation bearings, the current of the actuator winding is not increased until a lifting off takes place, but current pulses are injected with defined maximum values and the position of the limitation bearings is changed stepwise until a lifting off takes place. To achieve a lifting off of the rotor according to the arrangement in FIG. 2, the limitation bearing 42 has to be displaced to the right. If the actuator winding is designed for this, as an alternative to the current pulses, the defined maximum value of the current can also of course be impressed during the entire adjustment process.

Figure 4:
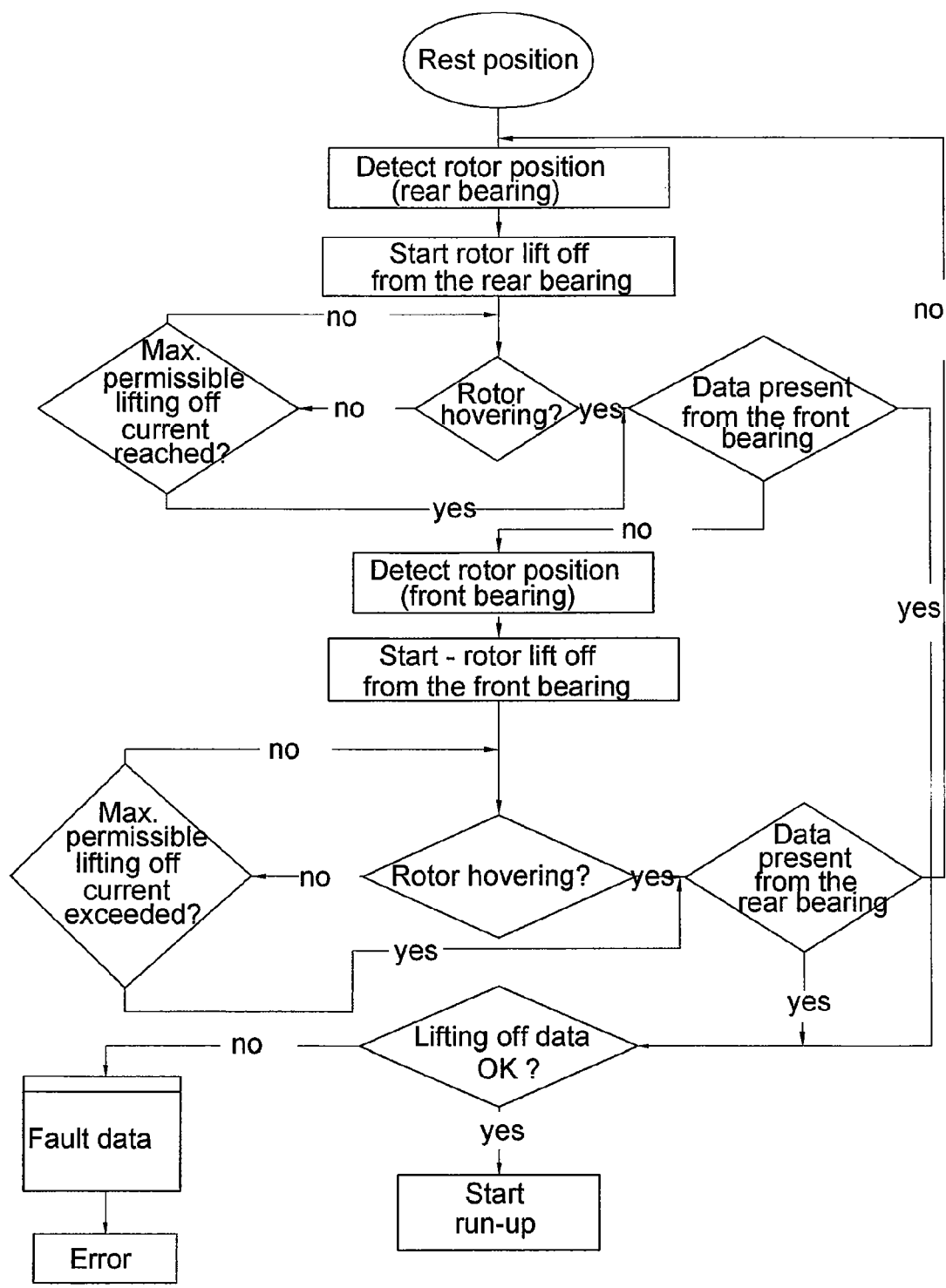
FIG. 4 shows a block diagram with a course and the evaluation of the lifting off processes.

FIG. 4 shows a block diagram with a possible sequence and the evaluation of the lifting off processes. The embodiment shown relates to the lifting off process of an electric machine for rotating a spinning cup of an open-end spinning machine. The front end of the rotor is, as already explained above, coupled to the spinning cup here. The front limitation bearing is not designed for the rotor to be permanently located in the front end position. Therefore, when the drive is decelerated, and also as far as possible in the case of a fault, the actuator system is activated to control the position in such a way that the rotor in the rest state is normally located in the rear end position. It should also be mentioned that for the embodiment described, a position sensor is used, which can only detect the change in the position in the axial direction and not the absolute position of the rotor. The term armature in the block diagram shown is to be taken as a synonym for rotor. On the basis of the position sensor used in the embodiment, the absolute rotor position is not known to the controller at the switch-on instant of the spinning machine. As the armature or the rotor prior to the run-up of the machine, as mentioned, is generally located in the rear end position, the actuator windings are provided with current in such a way that they would bring about a lifting off from the rear end position under normal circumstances. At this instant, the control unit does not yet know whether the rotor is actually in the rear end position. The controller, according to the cycle time, by evaluation of the position sensor signal, repeatedly queries whether the rotor is hovering. If this is not the case, the current is increased until a maximum permissible current is reached. This is determined by the maximum loadability of the electric components. If the rotor is hovering or the maximum permissible current has been reached, the process is interrupted and a query is made as to whether data from the front bearing are present. If this is not the case, lifting off from the front bearing is initiated. The process is then as for the rear bearing. If the rotor is hovering, a check is again made whether data from the rear bearing are present. Normally, this will be the case. Only if, for example, the rotor was not in the rear limitation bearing at the beginning of the process, but in the front one, is a lifting off attempt from the rear bearing initiated again. If lifting off data for the two limitation bearings are present, a check is made as to how much the selected system variables deviate from the reference values. In the example, these are the lifting off currents but could also be the rotor position information or the signals of force sensors. Of course, a plurality of system variables may also be evaluated.

If the lifting off data are in order, the run-up of the spinning rotor is started. If the lifting off data are not in order, the fault data are stored and a fault signal is generated which prevents the machine from starting up. The described sequence takes place before the first run-up of the spinning rotor after switching on the spinning machine and brings about an initialisation of the controller, so the latter knows the position of the rotor in the axial direction. If the voltage supply is not switched off, the controller, before a later run-up, can directly initiate a lifting off from the end position in which the rotor is actually located.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Method for starting an electric machine (10) with a magnetically mounted rotor (20), in particular for rotating the spinning cup of an open-end spinning machine, comprising the steps of:
   (a) magnetically supporting a rotor (20) via a magnetic bearing having permanent magnets (31, 32, 33, 34),
   (b) controlling the position of the rotor in an axial direction (35, 36) via an actuator system,
   (c) limiting the axial positioning of the rotor via two axial limitation bearings (41, 42) defining first and second axial end positions of the rotor,
   (d) activating the actuator system for moving the rotor from the first axial end position,
   (e) when moving the rotor from the first end position, comparing a system variable with an associated reference value,
   (f) moving the rotor (20) into the second end position,
   (g) activating the actuator system for moving the rotor from the second axial end position,
   (h) when moving the rotor from the second end position, comparing a system variable with an associated reference value, and
   (i) generating a fault signal in the event of a previously established deviation of a system variable from an associated reference value.

2. Method according to claim 1, characterised by providing the actuator system with at least one electric winding (35, 36).

3. Method according to claim 2, characterised by selecting the current impressed into the electric winding (35, 36) or a variable proportional thereto as a system variable.

4. Method according to claim 3, characterised by determining deviation from a reference value in relation to maximum values of a system variable.

5. Method according to claim 1 or 2, characterised by selecting measurement signals of a position sensor (43) for determining the axial position of the rotor as a system variable.

6. Method according to claim 1 or 2, characterised by selecting bearing forces on the axial limitation bearings as a system variable, and measuring the bearing forces by means of a sensor.

7. Method according to claim 1, characterised by preventing the machine from starting up by the fault signal.

8. Device with a control apparatus (50) for starting an electric machine (10) with a magnetically mounted rotor (20), in particular for rotating the spinning cup of an open-end spinning machine, the magnetic bearing having permanent magnets (31, 32, 33, 34), an actuator system for controlling the position in the axial direction (35, 36) and two axial limitation bearings (41, 42), by means of which the axial end positions of the rotor are determined, characterised in that the control apparatus is set up in such a way that it firstly brings about a lifting off from the first axial end position by means of the actuator system for controlling the position in the axial direction (35, 36), in that it then causes a movement of the rotor (20) into the second end position, in that it finally brings about a lifting off from the second axial end position by means of the actuator system for controlling the position in the axial direction, and in that it contains an evaluation mechanism, which compares a system variable, when lifting off from the first and the second end position, with reference values, and in the event of a previously established deviation of the system variable from the reference values, generates a fault signal.

9. Device according to claim 8, characterised in that the actuator system consists of at least one electric winding (35, 36).

10. Device according to claim 9, characterised in that the system variable is the current impressed into the electric winding (35, 36) or a variable proportional thereto.

11. Device according to claim 10, characterised in that the control mechanism (50) uses the maximum values of the system variable to determine the deviation from the reference values.

12. Device according to claim 8 or 9, characterised in that the control unit (50) uses, as the system variable, the measurement signals of the position sensor (43) for determining the axial position.

13. Device according to claim 8 or 9, characterised in that the control unit (50) uses as the system variable the bearing forces on the axial limitation bearings, the bearing forces being measured by means of a sensor.

14. Device according to claim 8, characterised in that the control apparatus (50), with the generation of the fault signal, prevents the machine from starting up.

* * * * *